(12) United States Patent
Farrar et al.

(10) Patent No.: US 6,869,128 B2
(45) Date of Patent: Mar. 22, 2005

(54) QUICK CHANGE WINDOW ASSEMBLY

(75) Inventors: Jerry Farrar, Banning, CA (US); Dale Carson, Murrieta, CA (US)

(73) Assignee: Transit Care, Inc., Murrieta, CA (US)

( * ) Notice: Subject to any disclaimer, the term of this patent is extended or adjusted under 35 U.S.C. 154(b) by 0 days.

(21) Appl. No.: 10/684,142

(22) Filed: Oct. 10, 2003

(65) Prior Publication Data

US 2004/0145214 A1 Jul. 29, 2004

Related U.S. Application Data

(60) Provisional application No. 60/418,385, filed on Oct. 11, 2002.

(51) Int. Cl.[7] .................................................. B60J 1/12
(52) U.S. Cl. ............................ 296/146.16; 296/146.15; 296/201
(58) Field of Search ...................... 296/146.15, 146.16, 296/201, 146.1; 52/204.591, 208, 204.5, 204.593, 204.597, 204.595, 204.51, 204.67, 213, 202; 49/380, 381; 29/854

(56) References Cited

U.S. PATENT DOCUMENTS

| 3,846,948 A | * | 11/1974 | Dallen ................... 52/204.597 |
| 4,134,240 A | * | 1/1979 | Bologna et al. ............... 52/202 |
| 4,723,809 A | * | 2/1988 | Kida et al. ................... 296/201 |
| 4,799,344 A | | 1/1989 | Francis |
| 4,800,681 A | | 1/1989 | Skillen et al. |
| 5,085,021 A | | 2/1992 | Kunert |
| 5,137,770 A | | 8/1992 | Rothe et al. |
| 5,509,711 A | | 4/1996 | Gold |
| 5,529,366 A | * | 6/1996 | Gold ..................... 296/146.15 |
| 5,613,325 A | | 3/1997 | Mariel |
| 5,635,281 A | | 6/1997 | Agrawal |
| 5,702,148 A | | 12/1997 | Vaughan et al. |
| 5,893,600 A | * | 4/1999 | McManus .............. 296/146.16 |
| 6,158,372 A | | 12/2000 | Erskine |
| 6,206,453 B1 | | 3/2001 | Farrar et al. |
| 6,263,627 B1 | | 7/2001 | Schonenbach et al. |
| 6,286,891 B1 | * | 9/2001 | Gage et al. ............ 296/146.15 |
| 6,312,043 B1 | * | 11/2001 | Blackburn et al. ..... 296/146.16 |
| 6,394,529 B2 | * | 5/2002 | Davis et al. ........... 296/146.16 |
| 6,412,225 B1 | * | 7/2002 | McManus .................... 49/381 |
| 6,460,917 B2 | * | 10/2002 | De Paoli .................... 296/201 |
| 6,490,788 B2 | * | 12/2002 | Carter et al. .................. 29/854 |
| 6,691,464 B2 | * | 2/2004 | Nestell et al. ................ 49/380 |
| 2001/0032422 A1 | * | 10/2001 | Farrar .................... 296/146.15 |
| 2002/0003356 A1 | | 1/2002 | Davis et al. |

* cited by examiner

*Primary Examiner*—Kiran Patel
(74) *Attorney, Agent, or Firm*—Knobbe, Martens, Olson & Bear, LLP

(57) ABSTRACT

A window assembly for a public transportation vehicle that permits rapid removal and replacement is disclosed. The vehicle has a sidewall with a window opening. One or more frame members are attached within the window opening. The frame members are adapted to comprise one or more apertures. One or more retainers are adhesively attached to the inner surface and towards the outer periphery of a piece of glazing. The retainers have protrusions that can extend through the apertures in the frame members and engage therewith when the piece of glazing is positioned adjacent to the window opening. Removable fasteners can be attached to the protrusions so as to detachably secure the piece of glazing and the retainers to the frame members. This allows easy removal and replacement of the piece of glazing from the window opening of the sidewall of the vehicle.

7 Claims, 5 Drawing Sheets

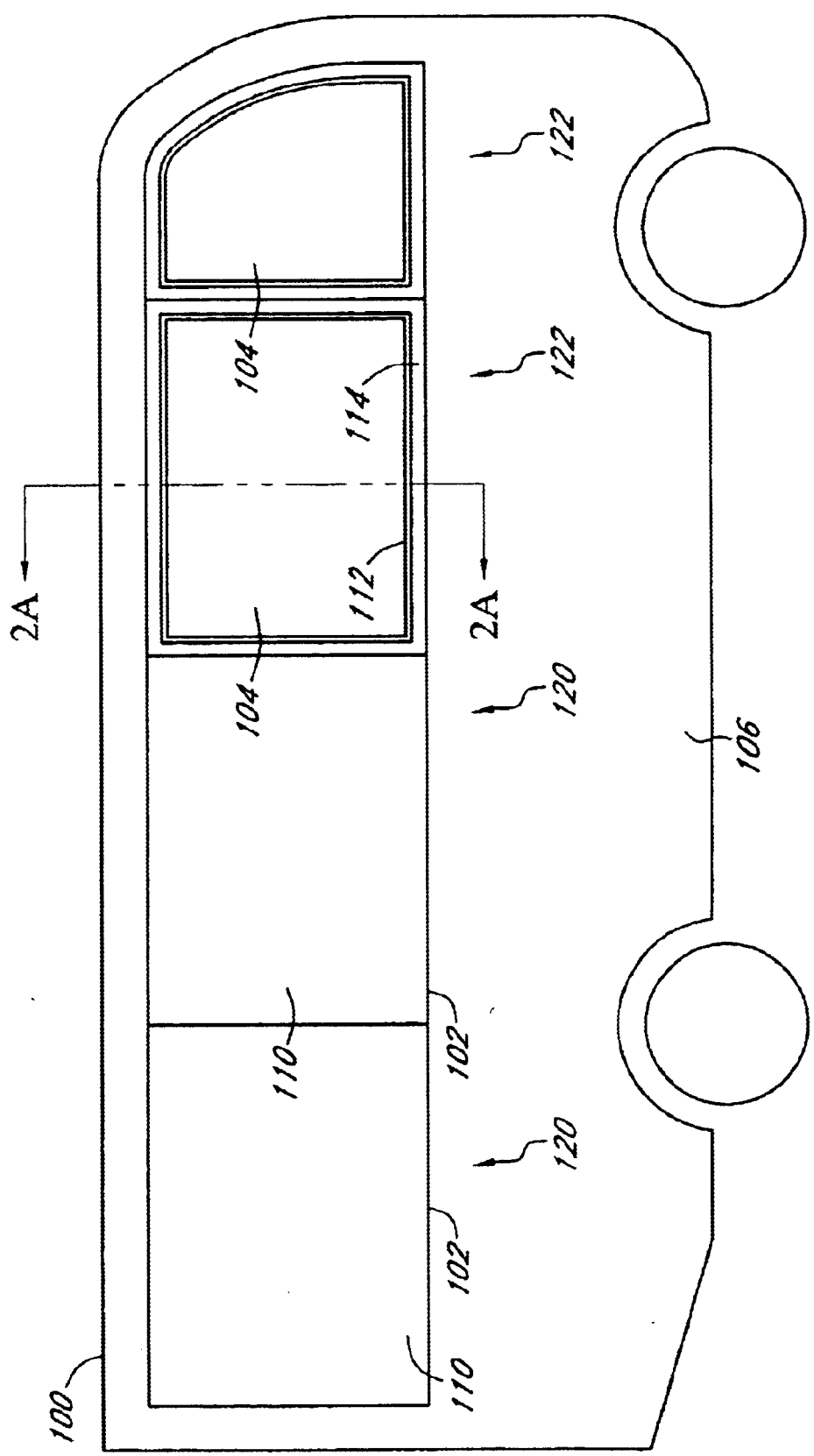

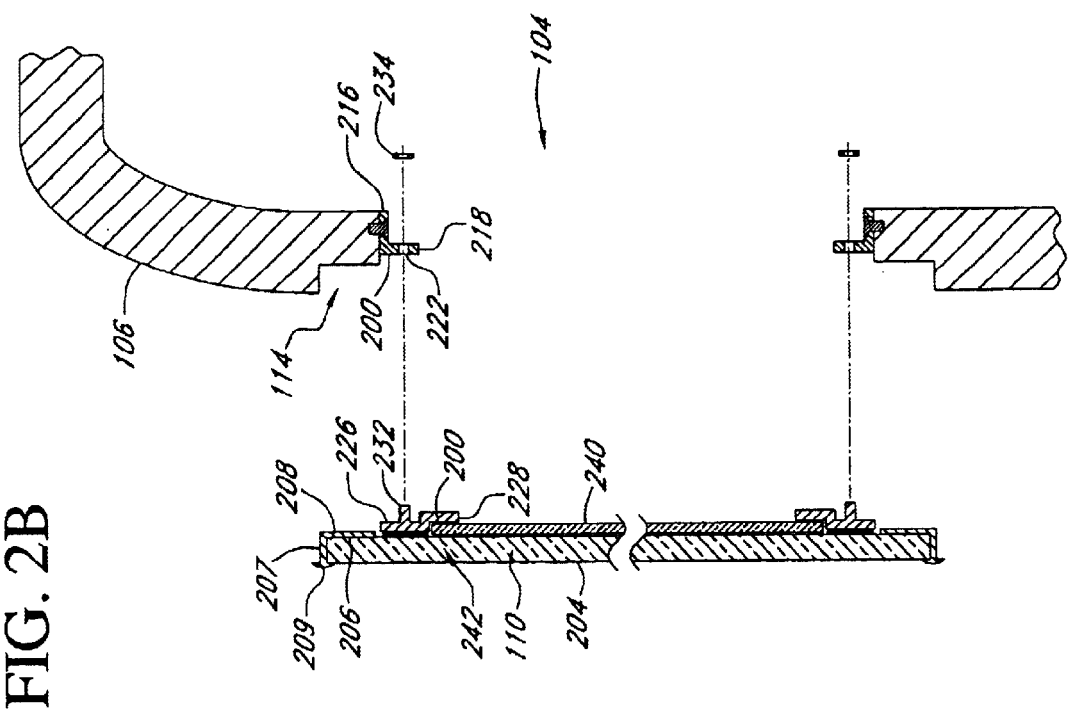
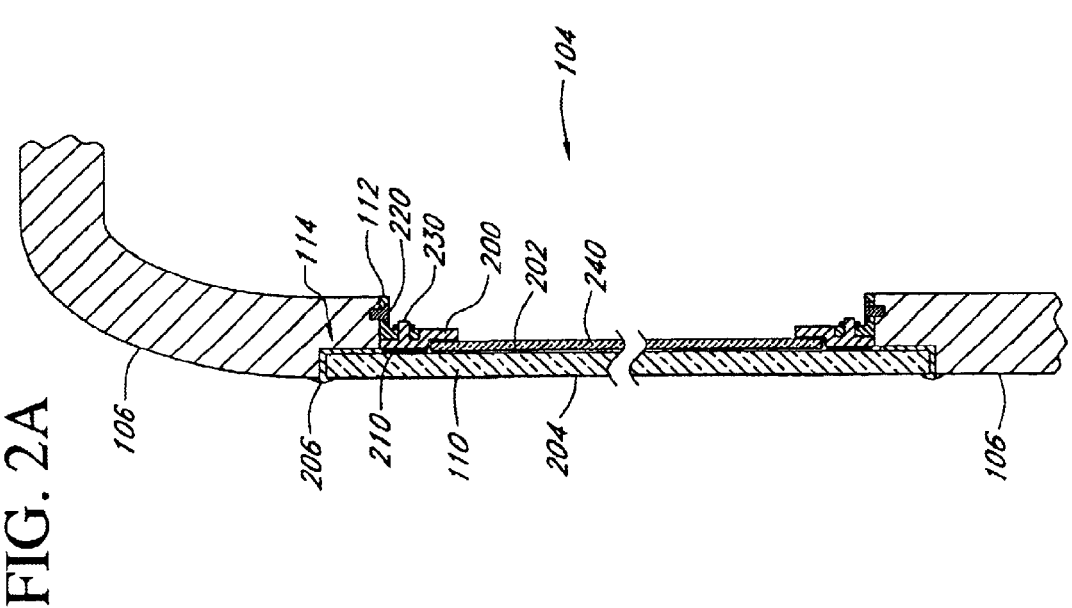

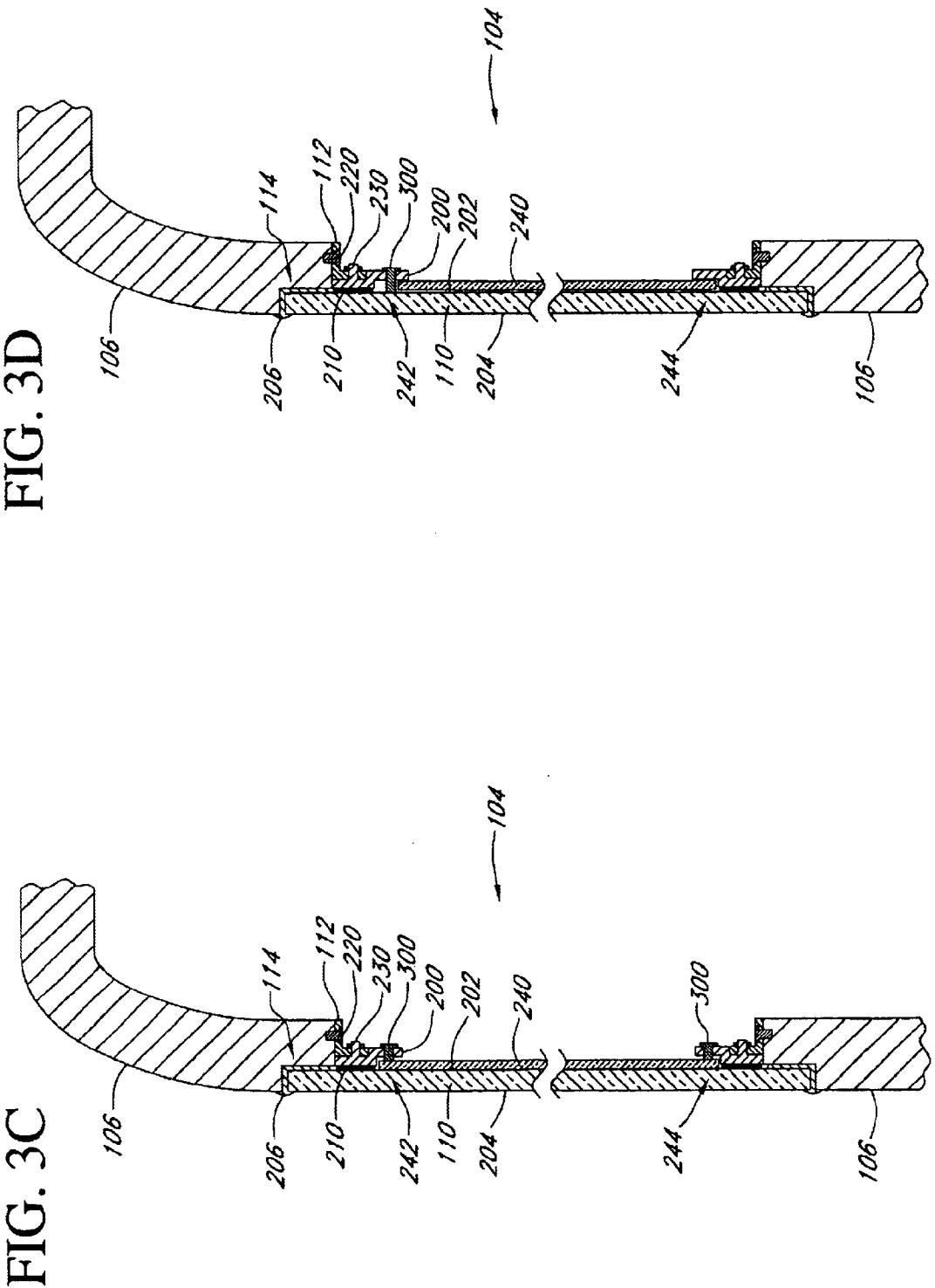
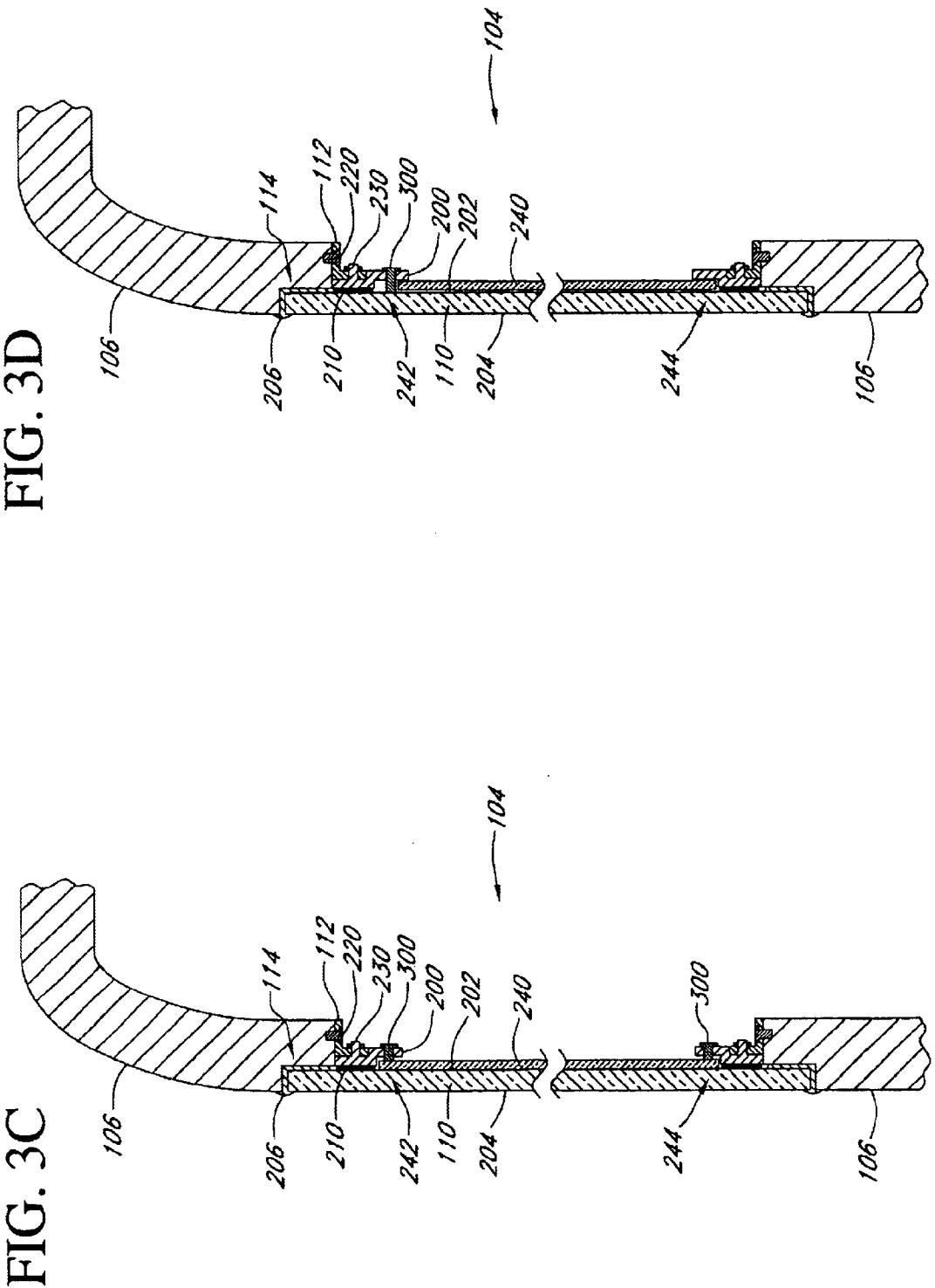

QUICK CHANGE WINDOW ASSEMBLY

CLAIM OF PRIORITY

This U.S. patent application claims priority to U.S. Provisional Patent Application No. 60/418,385, entitled "Quick Change Window Assembly" filed Oct. 11, 2002, which is hereby incorporated by reference herein.

BACKGROUND OF THE INVENTION

1. Field of the Invention

The present invention relates to window assemblies, and, in particular, concerns a replaceable glazing for window assemblies in public transportation vehicles.

2. Description of the Related Art

In recent years, ground based motor vehicles with aerodynamic exteriors have become popular due, at least in part, to a desirable appearance. In addition to aerodynamic exteriors, flush fitting window assemblies have also contributed to an improved aerodynamic appearance of vehicles including public transportation vehicles, such as buses.

Typically, the glazing of flush fitting window assemblies is recessed within the sidewall of a vehicle so as to form an aerodynamic exterior surface. In most cases, conventional glazing is attached to a recessed periphery around the window opening using an adhesive material, such as glue, epoxy, or putty. The adhesive must be of sufficient strength such that the glazing remains secured in place during use of the vehicle.

In some circumstances, the glazing may need to be replaced due to vandalism, such as breakage, chipping, scratches, and fractures, and also for maintenance needs, such as seal replacement. Consequently, replacing conventional glazing often requires removal of the adhesive used to secure the glazing to the window opening.

In general, removing a high strength adhesive from a flush fitting window assembly is time consuming and labor intensive, wherein conventional glazing removal procedures may require more than one person to work a generally known glazing removal tool. For example, the glazing removal tool is forced through the adhesive between the glazing and the framing supports in the sidewall of the vehicle. Usually, one worker is outside the vehicle and another worker is inside the vehicle on either side of the glazing. The glazing removal tool is moved back and forth by the workers in a cutting motion and guided around the entire periphery of the glazing so as to break the mounting seal of the adhesive. This cutting procedure is time consuming because it has to be performed slowly so as to not damage the window opening.

Once the seal of the adhesive is peripherally broken and the glazing is detached from the window opening, the remaining adhesive on the window opening needs to be removed. Unfortunately, removing the adhesive may cause permanent damage to the framing supports of the window opening. Scrapping the adhesive with a scrapping tool may cause adverse wear on the framing support surfaces, which may result in the framing supports of the window assemblies not properly sealing with reattached glazing. Also, this procedure may cause chipping or flaking of the paint around the window opening resulting in an undesirable appearance. Moreover, the adhesive may need to be scrapped off using undesirable chemical distillates that may evaporate into unhealthy fumes in the work area.

Once the old adhesive is removed, adhesive is reapplied to the window framing and allowed to cure for a lengthy amount of time for proper adherence of the glazing to the window framing. Unfortunately, the curing procedure incurs additional processing time for glazing replacement. In some cases, pressure needs to be applied around the perimeter of the glazing during curing. Otherwise, the glazing may not seal correctly to the window framing. If too much pressure is applied during curing, then the glazing may fracture, or the frame may deform. If too little pressure is applied during curing, then air gaps may form between the glazing and the window framing resulting in a degraded seal. As a result, the process of gauging the pressure and monitoring the pressure distribution on the glazing surfaces even further increases the amount of processing time for glazing replacement.

Therefore, due to the time consuming procedures, conventional glazing and adhesive removal processes require an exorbitant amount of down time for the vehicle. In the case of public transportation vehicles, the vehicles cannot be used in their designed capacity during the above described conventional window replacement processes resulting in loss revenue for the vehicle owner. Also, the manner in which conventional glazing replacement processes are conducted may result in permanent damage to the window openings.

From the foregoing, it will be appreciated that there is a need for an improved window assembly that is easily removable and replaceable while still maintaining the aerodynamic appearance of flush fitting window assemblies for vehicles. To this end, there also exists a need for a window mounting assembly that allows for multiple detachments and reattachments of the glazing from the window assembly with less difficulty such that glazing replacement is less labor intensive and time consuming.

SUMMARY OF THE INVENTION

The aforementioned needs may be satisfied by a window assembly for a vehicle having a window opening formed in a sidewall. In one embodiment, the window assembly comprises at least one frame mounting member that is adapted to be attached to at least a portion of the sidewall so as to be positioned within the window opening, wherein the at least one frame mounting member defines at least one first coupling component. In addition, the window assembly further comprises a piece of glazing having a substantially planar inner surface and a substantially planar outer surface, wherein the piece of glazing is sized so as to be positioned in a first orientation within the window opening formed in the sidewall of the vehicle. Moreover, the window assembly further comprises at least one glazing mounting member adapted to be adhered to the inner surface of the piece of glazing, wherein the at least one glazing mounting member includes at least one second coupling component that engages with the at least one first coupling component on the at least one frame mounting member when the piece of glazing is positioned in the first orientation in the window opening so as to secure the piece of glazing in the first orientation, and wherein the at least one frame mounting member and the at least one glazing mounting member can be detachably engaged from each other so as to permit removal of the piece of glazing and permit replacement of the piece of glazing with a second piece of glazing by reattachment of an at least one glazing mounting member to the inner surface of the second piece of glazing and re-engagement of the first and second coupling members.

In one aspect, the at least one frame mounting member comprises a member that has a first surface which is attached to a portion of the sidewall and a second surface that extends into the window opening defined in the sidewall. The at least one first coupling component comprises a plurality of holes formed in the second surface of the at least one frame mounting member. The at least one second coupling component comprises a plurality of protrusions, and wherein the at least one glazing mounting member is adhered to the inner surface of the piece of glazing at a location selected so that the plurality of protrusions extend through the plurality of holes in the at least one first coupling component so as to be detachably secured thereto. In addition, the window assembly further comprises a plurality of fasteners that attach to the plurality of protrusions so as to secure the protrusions in the openings defined by the at least one frame mounting member.

In another aspect, the at least one glazing mounting member comprises a plurality of glazing mounting members positioned adjacent the outer periphery of the piece of glazing, and wherein each of the at least one glazing mounting members defines a first section that is adhered flush to the inner surface of the glazing and a second section that is spaced away from the inner surface of the glazing so as to define at least one recess when the first section is adhered flush to the inner surface of the glazing. In addition, the window assembly further comprises a sacrificial layer that is positioned within the at least one recess so as to be interposed between the inner surface of the piece of glazing and the interior of the vehicle so as to inhibit damage to the inner surface of the piece of glazing. Moreover, the window assembly further comprises a locking mechanism attached to the second section of the at least one glazing mounting member, wherein the locking mechanism secures the sacrificial layer in the recess between the inner surface of the piece of glazing and the at least one glazing mounting member.

In still another aspect, the sidewall comprises a window mounting recess positioned adjacent to the periphery of the window opening, and wherein the window mounting recess is adapted to receive at least a portion of the piece of glazing such that, when the piece of glazing is positioned within the window opening, the outer surface of the piece of glazing is flush fitting with the outer surface of the sidewall. In addition, the assembly further comprises a sealing gasket that is positioned between the piece of glazing and the window mounting recess. Moreover, the at least one glazing mounting member is adhered to the inner surface of the piece of glazing using at least one material selected from the group consisting of glue, epoxy, and putty.

The aforementioned needs may also be satisfied by a window assembly for a vehicle having a window opening with a recessed periphery formed in a sidewall of the vehicle. In one embodiment, the assembly comprises at least one frame member having a first leg member mounted within the window opening of the vehicle, the at least one frame member having a second leg member with a plurality of apertures formed there through. In addition, the assembly comprises a piece of glazing having an inner surface that is positioned, at least in part, adjacent the recessed periphery of the window opening such that an outer surface of the glazing substantially aligns with the outer surface of the sidewall. Moreover, the assembly comprises at least one retainer having a mounting surface attached to at least a portion of the inner surface of the piece of glazing and a plurality of protrusions that extend through the plurality of apertures when the piece of glazing is positioned adjacent to the recessed periphery and are detachably engaged to a plurality of fasteners so as to secure the at least one retainer to the at least one frame member thereby securing the piece of glazing to the window opening in a manner such that the piece of glazing can be removed by disengaging the fasteners from the protrusions and reattached by re-engaging the fasteners to the protrusions when the protrusions are re-extended through the plurality of apertures.

In one aspect, the retainer further comprises an extending member that distally extends from the mounting surface of the retainer so as to define a slotted region between the member and around at least a portion of the perimeter of the piece of glazing. In addition, the window assembly further comprises a protective panel that is positioned adjacent the inner surface of the piece of glazing and secured by the slotted region defined by the extending member of the retainer. Also, the retainer further comprises at least one locking member that is attached to the extending member and, when actuated, the locking member further secures the protective panel in the slotted region.

In another aspect, the at least one retainer comprises a plurality of retainers adhesively attached to the outer periphery of the piece of glazing, wherein each of the retainers comprises at least one protrusion. In addition, the at least one frame member comprises a plurality of frame members, wherein each of the frame members comprise a first leg member mounted within the window opening of the vehicle and a second leg member having at least one aperture that is positioned to interconnect with the at least one protrusion of the retainer when the protrusion is extended through the at least one aperture. Moreover, the assembly further comprises a sealing gasket that is positioned between the piece of glazing and the recessed periphery of the window opening.

The aforementioned needs may also be satisfied by a window assembly for a vehicle having a sidewall with a window opening formed therein. In one embodiment, the window assembly comprises a framing member attached to the sidewall so as to be positioned within the window opening, wherein the framing member defines a first coupling component and a first glazing member sized so as to be positioned in the window opening adjacent to the framing member. In addition, the window assembly further comprises a mounting member attached to the first glazing member, wherein the mounting member defines a second coupling component that is adapted to engage with the first coupling component when the first glazing member is positioned in the window opening adjacent to the framing member, and wherein the framing member and the mounting member can be detachably engaged from each other so as to permit removal of the first glazing member from the window opening.

In one aspect, the framing member and the mounting member can be detachably engaged from each other so as to further permit replacement of the first glazing member with a second glazing member by reattachment of mounting member to the second glazing member and re-engagement of the first and second coupling members. In addition, the framing member comprises a plurality of framing members that are arranged so as to be positioned within the window opening and attached to the sidewall. Also, the framing member defines a plurality of first coupling components, and wherein the mounting member defines a plurality of second coupling components that are adapted to engage the plurality of first coupling components. Moreover, the mounting member comprises a plurality of mounting members that are attached to the first glazing member.

In another aspect, the first coupling component comprises one or more apertures formed in the framing member. In addition, the second coupling component comprises one or more protrusions that are adapted to extend from the mounting member through the one or more apertures formed in the framing member. Also, the window assembly further comprises one or more fasteners that are adapted to mount to the one or more protrusions so as to secure the one or more protrusions of the mounting member to the one or more apertures of the framing member.

In still another aspect, the mounting member comprises one or more mounting members positioned adjacent the outer periphery of the glazing member, and wherein each of the mounting members defines a first section that is adhered flush to the glazing member and a second section that is spaced away from the glazing member so as to define at least one recess when the first section is adhered flush to the inner surface of the glazing. In addition, the window assembly further comprises a sacrificial layer that is positioned within the at least one recess so as to be interposed between the glazing member and the interior of the vehicle so as to inhibit damage to the glazing member. Also, the window assembly further comprises a locking mechanism attached to the second section of the mounting member, wherein the locking mechanism secures the sacrificial layer in the at least one recess between the glazing member and the mounting member. Moreover, the sidewall comprises a mounting recess positioned adjacent to the periphery of the window opening, and wherein the mounting recess is adapted to receive at least a portion of the glazing member such that, when the glazing member is positioned in the window opening, the outer portion of the glazing member is flush fitting with the outer portion of the sidewall. Also, the assembly further comprises a sealing gasket that is positioned between the glazing member and the mounting recess.

The aforementioned needs may also be satisfied by a method of installing glazing into a window opening of a vehicle. In one embodiment, the method comprises attaching at least one frame mounting member to a surface of the vehicle such that a portion extends into the plane of the window opening and attaching at least one glazing mounting member to a piece of glazing sized to be positioned within the window opening. In addition, the method comprises positioning the piece of glazing in the window opening such that the at least one frame mounting member and the at least one glazing mounting member are positioned proximate each other and coupling the frame mounting member and the glazing mounting member to each other so as to secure the piece of glazing in the window opening.

In one aspect, attaching the at least one frame mounting member comprises mounting a plurality of frame mounting members about 4 sides of the window opening. In addition, attaching the frame mounting members comprises mounting an L-shaped member with an opening on one leg to the sidewall of the vehicle immediately adjacent the window opening such that the leg containing the opening is positioned within the plane of the window. Also, attaching at least one glazing mounting member comprises adhering a plurality of glazing mounting members each having a protrusion to the piece of glazing at locations such that the protrusions extend through the openings in the plurality of frame mounting members.

In another aspect, coupling the frame mounting member to the glazing mounting member comprises attaching a fastener to the protrusions so as to inhibit removal of the protrusions from the openings. In addition, positioning the piece of glazing in the window opening comprises positioning the piece of glazing within a window mounting recess formed adjacent to the periphery of the window opening such that, when the piece of glazing is positioned within the window mounting recess, the outer surface of the piece of glazing is flush fitting with the outer surface of the sidewall. Also, positioning the piece of glazing in the window opening comprises positioning a sealing gasket between the piece of glazing and the window opening.

In still another aspect, attaching at least one glazing mounting member to a piece of glazing comprises positioning the glazing mounting member adjacent the outer periphery of the piece of glazing, and wherein the at least one glazing mounting member defines a first section that is adhered flush to the piece of glazing and a second section that is spaced away from the piece of glazing so as to define at least one recess when the first section is adhered flush to the inner surface of the piece of glazing. In addition, the method further comprises positioning a sacrificial layer within the at least one recess so as to be interposed between the piece of glazing and the interior of the vehicle so as to inhibit damage to the piece of glazing. Also, the method further comprises securing the sacrificial layer to the second section of the glazing mounting member with a locking mechanism, and wherein locking mechanism secures the sacrificial layer in the at least one recess between the piece of glazing and the glazing mounting member.

These and other aspects, advantages, and novel features of the invention will become apparent upon reading the following detailed description and upon reference to the accompanying drawings. In the drawings, similar elements have similar reference numerals.

BRIEF DESCRIPTION OF THE DRAWINGS

FIG. 1 illustrates one embodiment of a public transportation vehicle having windows mounted within openings in a sidewall of the vehicle.

FIG. 2A illustrates a cross sectional view of one embodiment of a window assembly with a glazing in the installed configuration, wherein a retainer is mounted to the glazing using an adhesive and detachably connected to the frame member using a bolting mechanism.

FIG. 2B illustrates a cross sectional view of one embodiment of the window assembly of FIG. 2A in a partially unassembled configuration, wherein the retainer remains mounted to the glazing as illustrated in FIG. 2A and disconnected from the frame member by disengaging the bolting mechanism.

FIGS. 3C and 3D illustrate cross-sectional views of some of the possible variations to the window assembly of FIG. 2A, wherein one or mare retainers with the locking members are used to secure the sacrificial protective panel adjacent to the glazing.

DETAILED OF THE PREFERRED EMBODIMENT

Figure 3A:
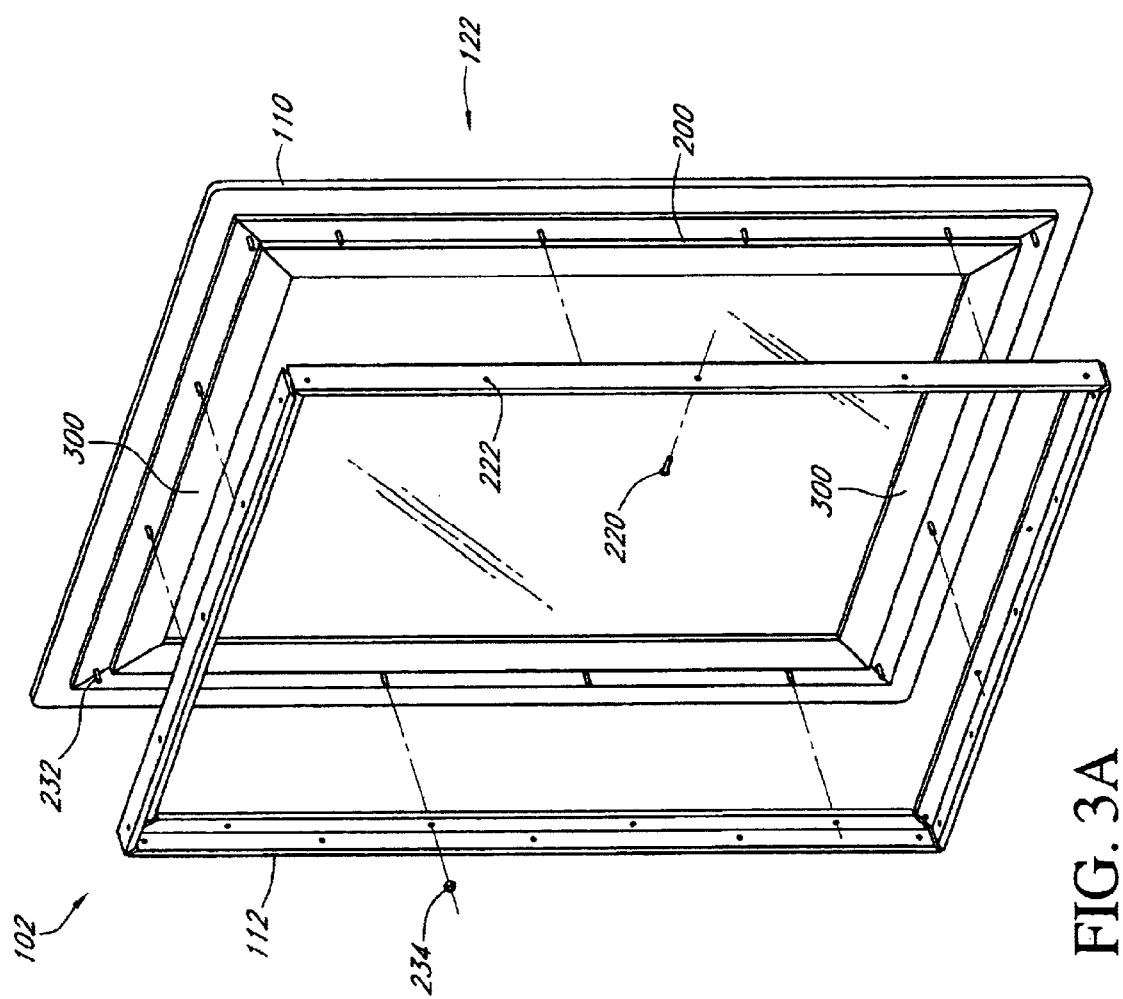
FIG. 3A illustrates a perspective view of one embodiment of a frame mounting member that facilitates mounting of the window assembly of FIGS. 2A and 2B, wherein a locking member is used to secure a sacrificial protective layer adjacent to the glazing.

Reference will now be made to the drawings wherein like numerals refer to like parts throughout. FIG. 1 illustrates one embodiment of a public transportation vehicle 100 having window assemblies 102 mounted within window openings 104 in a sidewall 106 of the vehicle 100. As will be described in greater detail herein below, each window assembly 102 may comprise at least one piece of glazing 110 that may be detachably engaged with at least one frame mounting member 112 so as to permit attachment, detachment, and reattachment in a rapid manner. As illustrated in FIG. 1, the piece of glazing 110 is shown in an attached or reattached configuration 120 and a detached configuration 122.

In one embodiment, the piece of glazing 110 may comprise a substantially planar inner surface and a substantially planar outer surface. The piece of glazing 110 may be sized so as to be positioned in a first orientation within the window opening 104 formed in the sidewall 106 of the vehicle 100. The first orientation may comprise a recessed orientation, wherein a recessed periphery 114 around the perimeter of the window opening 104 is used to positioned the glazing 110, at least in part, within the window opening 104. In one aspect, the recessed periphery 114 of the window opening 104 may be integrally formed as part of the sidewall 106, and the frame mounting member 112 may be attached to at least a portion of the sidewall 106 so as to also be positioned, at least in part, within the window opening 104.

It should be appreciated that, even though the following discussion is described in connection with a bus, the window mounting assembly as described herein may be used in various applications including other types of public transportation vehicles, such as trains and boats, and fixed window environments, such as buildings and industrial structures. As will also be apparent from the following discussion, the window mounting assembly of the present invention facilitates rapid installation, removal, and replacement of glazing.

FIG. 2A illustrates a cross sectional view of one embodiment of the glazing 110 in the attached or reattached configuration 120. FIG. 2B illustrates a cross sectional view of one embodiment of the glazing 110 in the detached configuration 122. In particular, FIGS. 2A, 2B illustrate the manner in which the glazing 110 is positioned and secured within the window opening 104 and then easily detached for rapid removal and replacement.

As illustrated in FIG. 2A, the glazing 110 is positioned adjacent the recessed periphery 114 so as to be positioned, at least in part, within the window opening 104. An outer surface of the 204 of the glazing 110 substantially aligns with the outer surface of the sidewall 106 forming, in one embodiment, a flush fitting window assembly. It should be appreciated that the window opening 104 may not comprise a recessed periphery 114 and that the glazing 110 may be positioned adjacent to the exterior surface of the sidewall 106 such that the glazing 110 is not positioned within the window opening 104 without departing from the scope of the present invention.

A sealing component 206, such as a rubber gasket, may be positioned between the glazing 110 and the recessed periphery 114 so as to form a seal and insulate the interior of the vehicle 100 from the exterior environment outside the vehicle 100. As illustrated in FIG. 2B, the sealing component 206 may comprise a first and second gasket member 207, 208 that are attached at distal ends so as to form an L-shaped gasket structure. At the distal end of the first gasket member 207, the midpoint of a barrier section 209 is attached to form an exterior seal extending from the exterior surface of the sidewall 106 to the outer surface 204 of the glazing 110. In one aspect, the barrier section 209 may comprise a semi-curricular shape having a flat lower base attached to the first member 207 of the sealing component 206. In another aspect, the barrier section 209 may comprise a flat rectangular shape having an underside attached to the first member 207 of the sealing component 206.

In addition, it should be appreciated that the sealing component 206 may also function as a cushioning device that reduces the impact of vibrations caused during motion of the vehicle 100. It should also be appreciated that the sealing component 206 may be attached to either the glazing 110 or the recessed periphery 114 using an adhesive, such as glue, prior to positioning the glazing 110 adjacent the recessed periphery 114 without departing from the scope of the present invention.

The frame mounting member 112 is shown attached to the sidewall 106 within the window opening 104 using a first fastener 220, such as a screw, in a generally known manner. The frame mounting member 112 may be formed of a resilient material, such as aluminum, plastic, or various composite materials and may be adapted to fit the size and shape of various window openings in most vehicles. In one embodiment, the frame mounting member 112 is an L-shaped structure having a first and second leg member 216, 218 attached at distal ends, wherein the first leg 216 of the frame mounting member 112 may be mounted to an interior surface of the window opening 104. In addition, the second leg 218 of the frame mounting member 112 extends from the first leg 216 into the window opening 104 and is adapted with at least one first coupling component 222, such as an aperture or hole (shown in FIG. 2B), to receive at least one second coupling component 230 of the retainer 200 in a manner as described herein below. Moreover, the first coupling component 222 may comprise a plurality of apertures or holes formed in the frame mounting member 112 without departing from the scope of the present invention.

In one aspect, the frame mounting member 112 may also be elongated to fit the length or height of the window opening 104 or contoured to fit the shape of the window opening 104. It should be appreciated that the at least one first coupling component 222 may be adapted to receive an interlocking ridge, hook, or the like for the purpose of securing the retainer 200 to the frame mounting member 112 without departing from the scope of the present invention. Additionally, it should be appreciated that an adhesive, such as glue may be used in conjunction with the at least one first fastener 220 or screw to attach the frame mounting member 112 to the sidewall 106 without departing from the scope of the present invention. It should also be appreciated that a plurality of frame mounting members 112 may be attached to one or more of the upper, lower, and side interior surfaces of the window opening 104 without departing from the scope of the present invention.

In one embodiment, a glazing mounting member or retainer 200 is mounted to at least a portion of the inner surface 202 of the glazing 110 using an adhesive 210, such as a silicon or epoxy resin adhesive, and detachably engaged to the frame mounting member 112 using at least one second coupling component 230. As with the frame mounting member 112, the retainer 200 may be formed of a resilient material, such as aluminum, plastic, or various composite materials and may be adapted to fit the size and shape of various window openings in most vehicles. The retainer 200 may also be elongated to fit the length or height of the glazing 110 or contoured to fit the shape of the glazing 110. As illustrated in FIG. 2B, the retainer 200 may comprise a base member 226 having a first and second mounting surface 227a, 227b. Moreover, the upper portion of the inner surface 202 of the glazing 110 is shown mounted to the first mounting surface 227a of the base member 226.

The second coupling component 230 may comprise at least one protrusion or bolt member 232 that perpendicularly extends from the second mounting surface 227b of the base member 226 and engages the first coupling component 222 (shown in FIG. 2B) of the frame mounting member 112. The second coupling component 230 may be integrally formed as part of the base member 226, or the second coupling component 230 may be attached to the base member 226 via welding, etc. without departing from the scope of the present invention. The second coupling component 230 of the retainer 200 is secured to the first coupling component 222 of the frame mounting member 112 by a second fastener 234, such as a nut. In one embodiment, the protrusion or bolt member 232 is threaded so as to receive the second fastener or nut 234. In another embodiment, the retainer 200 comprises a plurality of protrusions 232 that engage the frame mounting member 112 via a plurality of holes 222 and are detachably secured to the frame mounting member 112 with a plurality of nuts 234. It should be appreciated by one skilled in the art that various other coupling arrangements, such as interlocking ridges, hooks, or the like, may be used to ensure positive retention of the retainer 200 to the frame mounting member 112.

The second fastener 234 rigidly secures the glazing 110 in the first orientation or recessed periphery 114 within the window opening 104 of the sidewall 106. Advantageously, the second fastener 234 may be removed to allow removal of the glazing 110 and then re-engaged to allow replacement or reattachment of the glazing 110 to the frame mounting member 112 in a timely manner. In the prior art, the adhesive has to be cut away from the glazing and removed from the window opening prior to glazing replacement, wherein the conventional glazing replacement procedure is labor intensive and time consuming in a manner as previously described. Conversely, less time is needed to remove and replace glazing in a vehicle comprising the window assembly of the present invention due to the ease and speed at which the fasteners 234 may be removed and replaced. As a result, the present invention offers rapid glazing replacement for window assemblies in most vehicles, such as public transportation vehicles. In addition, existing vehicles may be retrofitted with the frame mounting members so as to improve the temporal efficiency of glazing replacement, wherein the frame mounting members and the glazing may be adapted to fit most vehicles.

The retainer 200 may further comprise a flanged member 228 that extends in a parallel manner from the base member 226. The flanged member 228 is distally spaced from base member 226 such that the flanged member 228 defines a slotted region or space 242 that is capable of receiving a sacrificial protective panel 240. Desirably, the sacrificial protective panel 240 slides between the glazing 110 and the retainer 200 in the slotted region 242 and serves to protect the surfaces of the glazing 110 from vandalism. Additional protective scope and functionality of the sacrificial protective panel 240 is described in greater detail in the Applicant's issued U.S. Pat. No. 6,206,453 entitled, "Window Protector Assembly," which is hereby incorporated by reference in its entirety.

In one embodiment, the protective panel 240 is formed of a substantially flexible and resilient material that is easily flexed at its edges into position between the glazing 110 and the one or more retainers 200. When the protective panel 240 is released, it resumes its unflexed shape adjacent to the glazing 110 and the edges are secured by the flanged member 228 of the retainer 200. Such an arrangement allows for easy removal from the protective panel 240 using generally known tools, such as a suction gripping device. Additional scope and functionality relating to the protective panel 240 is described in greater detail in the Applicant's issued U.S. Pat. No. 6,408,574 entitled, "Quick Release Sacrificial Shield and Window Assembly," which is hereby incorporated by reference in its entirety.

FIG. 3A illustrates a perspective view of one embodiment of the glazing 110 and the frame mounting members 112 of the window assembly 102 in the detached configuration 122. The glazing 110 is shown attached to a plurality of retainers 200 that may be mounted towards the outer edges or periphery of the glazing 110 so as to be substantially parallel with corresponding frame mounting members 112. As shown, the first coupling components 222 of the frame mounting members 112 substantially align with the second coupling components 232 of the retainers 200 and the second fasteners 234.

Figure 3B:
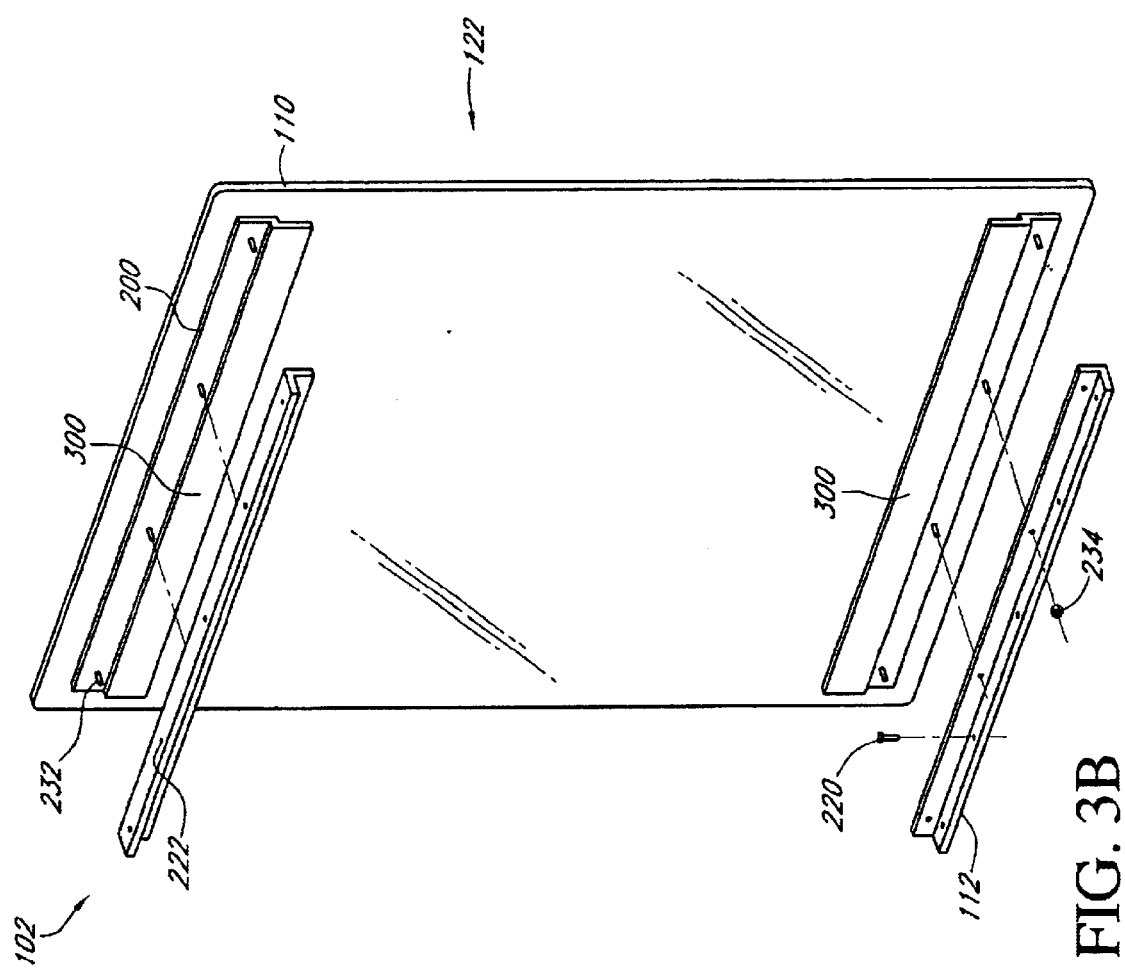
FIG. 3B illustrates a perspective view of another embodiment of the frame mounting member that can facilitate mounting of the window assembly of FIGS. 2A and 2B, wherein the frame mounting member includes at least two frame mounting sections positioned at opposing ends of the window opening so as to receive a plurality of second coupling components of at least two retainers.

In another embodiment, as illustrated in FIG. 3B, at least two retainers 200 may be attached to the glazing 110 at opposing ends so as to support at least one sacrificial protective panel 240. Similarly, the frame mounting member 112 may comprise one or more component pieces without departing from the scope of the present invention. In yet another embodiment, as illustrated in FIG. 3B, at least two frame mounting members 112 may be positioned at opposing ends of the window opening 104 so as to receive one or more second coupling components 230 of the one or more retainers 200.

It should be appreciated that the orientation of the at least two retainers 200 and frame mounting members 212 may be positioned on right and left side portions or the upper and lower portions of the window opening 104 or all four sides of the window opening 104 without departing from the scope of the present invention. Such arrangements may improve the ease with which the glazing 110 and the protective panel 240 are removed, replaced, or reattached. Advantageously, one or more of the frame mounting members 112 and retainers 200 may be adapted to fit various sizes and shapes of window openings so as to promote easy installation, removal, and replacement.

FIGS. 3A, 3B further illustrate the addition of one or more locking members 300 to the frame mounting members 214. FIG. 3C illustrates the cross-sectional view of the glazing 110 of FIG. 2A in the attached or reattached configuration 120, wherein the one or more locking members 300 of FIG. 3A are shown securing the sacrificial protective panel 240 to the glazing 110. In one embodiment, as illustrated in FIG. 3C, the one or more locking members 300 may comprise a flat screw that is placed in a hole in the retainer 200 and, when tightened down, secures the sacrificial protective panel 240 adjacent to the inner surface of the glazing 110. As previously described, the protective panel 240 may comprise a flexible material such that, when flexed, the upper and lower edges of the protective panel 240 may be positioned adjacent the inner surface 202 of the glazing 110. Subsequently, when unflexed, the protective panel 240 may slide into an upper and lower slotted region 242, 244 defined by the flanged members 228 of the retainers 200. The locking members 300 secure the protective panel 240 to the glazing 110 when in this particular position.

Alternatively, as illustrated in FIG. 3D, the retainer 200 may comprise an elongated flanged member 228 so as to form an upper slotted region 242 that is at least longer than a lower slotted region 244. In this particular embodiment, the upper edge of the sacrificial protective panel 240 is first placed in the upper slotted region 242 and slid towards the upper portion of the upper slotted region 242. This allows the lower edge of the protective panel 240 to fit into the lower slotted region 244 and slide down towards the lower portion of the lower slotted region 244. When in this position, a gap is formed above the upper edge of protective panel 240 towards the upper portion of the upper slotted region 242. At this point, the locking mechanism 300 can be positioned to block the gap so as to prevent the protective panel 240 from sliding upwards, which further prohibits removal of the protective panel 240 from the retainers 200. In one aspect, the locking members 300 may comprise one or more retaining gaskets that are adapted to secure the sacrificial protective panel 240 in a manner as described in the Applicant's issued U.S. Pat. No. 6,408,574.

From the foregoing description, it should be appreciated that the installation, removal, and replacement of the glazing 110 is easy and rapid. For example, the retainers 200 may be easily attached to the glazing 110 using the adhesive 210, such as epoxy resin. Following, the retainer 200 and glazing 110 assembly may then be detachably engaged to the frame mounting member 112 in an easy manner using fasteners, such as the protrusion member 232 and the nut fastener 234. If the glazing 110 needs to be removed or replaced for some reason, rapid detachment and replacement of the glazing 110 is easily accomplished due to the detachable engagement of the retainer 200 to the frame mounting member 112. For example, the nut 234 can be loosened and removed from the protrusion member 232, then the protrusion member 232 can be disengaged from the apertures or holes 222 in the frame mounting member 112. Subsequently, the glazing 1-10 and retainer 200 assembly is readily detached from the frame mounting member 112. Then, either a the same or another glazing 110 and retainer 200 assembly may be re-attached or replaced with less difficulty.

Advantageously, the glazing 110, frame mounting members 112, and the retainers 200 may be adapted in size and shape to fit or retrofit most existing vehicles, such as public transportation vehicles. In particular, the frame mounting members 112 may be easily attached to the interior of the window opening 104 using fasteners 220, such as screws. As a result, many currently used public transpiration vehicles, such as buses, could be retrofitted with the quick change window assembly of the present invention. The size and shape of the glazing 110, frame mounting members 112, and the retainers 200 may be adapted to retrofit most window openings in most conventional vehicles. Once older, unmanageable window assemblies are removed, the quick change window assemblies of the present invention may be easily installed into existing window openings of currently used vehicles. Once installed, the advantages of rapid removal and replacement of the quick change window assemblies of the present invention can be realized.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

What is claimed is:

1. A window assembly for a vehicle having a window opening with a recessed periphery formed in a sidewall of the vehicle, the assembly comprising:

at least one frame member having a first leg member mounted within the window opening of the vehicle, the at least one frame member having a second leg member with a plurality of apertures formed there through;

a piece of glazing having an inner surface that is positioned, at least in part, adjacent the recessed periphery of the window opening such that an outer surface of the glazing substantially aligns with the outer surface of the sidewall; and at least one retainer having a mounting surface attached to at least a portion of the inner surface of the piece of glazing and a plurality of protrusions that extend through the plurality of apertures when the piece of glazing is positioned adjacent to the recessed periphery and are detachably engaged to a plurality of fasteners so as to secure the at least one retainer to the at least one frame member thereby securing the piece of glazing to the window opening in a manner such that the piece of glazing can be removed by disengaging the fasteners from the protrusions and reattached by re-engaging the fasteners to the protrusions when the protrusions are re-extended through the plurality of apertures.

2. The assembly of claim 1, wherein the retainer farther comprises an extending member that distally extends from the mounting surface of the retainer so as to define a slotted region between the member and around at least a portion of the perimeter of the piece of glazing.

3. The assembly of claim 2, wherein the window assembly further comprises a protective panel that is positioned adjacent the inner surface of the piece of glazing and secured by the slotted region defined by the extending member of the retainer.

4. The assembly of claim 3, wherein the retainer further comprises at least one locking member that is attached to the extending member and, when actuated, the locking member further secures the protective panel in the slotted region.

5. The assembly of claim 1, wherein the at least one retainer comprises a plurality of retainers adhesively attached to the outer periphery of the piece of glazing, wherein each of the retainers comprises at least one protrusion.

6. The assembly of claim 5, wherein the at least one frame member comprises a plurality of frame members, wherein each of the frame members comprise a first leg member mounted within the window opening of the vehicle and a second leg member having at least one aperture that is positioned to interconnect with the at least one protrusion of the retainer when the protrusion is extended through the at least one aperture.

7. The assembly of claim 1, wherein the assembly further comprises a sealing gasket that is positioned between the piece of glazing and the recessed periphery of the window opening.

* * * * *